US009523519B2

(12) United States Patent
Muller

(10) Patent No.: US 9,523,519 B2
(45) Date of Patent: Dec. 20, 2016

(54) MAGNETOCALORIC HEAT GENERATOR

(71) Applicant: COOLTECH APPLICATIONS, S.A.S., Holtzheim (FR)

(72) Inventor: Christian Muller, Strasbourg (FR)

(73) Assignee: COOLTECH APPLICATIONS, S.A.S., Holtzheim (FR)

( * ) Notice: Subject to any disclaimer, the term of this patent is extended or adjusted under 35 U.S.C. 154(b) by 305 days.

(21) Appl. No.: 14/351,922

(22) PCT Filed: Oct. 24, 2012

(86) PCT No.: PCT/FR2012/000431
§ 371 (c)(1),
(2) Date: Apr. 15, 2014

(87) PCT Pub. No.: WO2013/060946
PCT Pub. Date: May 2, 2013

(65) Prior Publication Data
US 2014/0325996 A1 Nov. 6, 2014

(30) Foreign Application Priority Data
Oct. 28, 2011 (FR) ..................... 11 59839

(51) Int. Cl.
*F25D 3/08* (2006.01)
*F25B 21/00* (2006.01)
*F25B 29/00* (2006.01)

(52) U.S. Cl.
CPC ............... *F25B 21/00* (2013.01); *F25B 29/00* (2013.01); *Y02B 30/66* (2013.01)

(58) Field of Classification Search
CPC ... F25B 21/00; F25B 2321/0021; Y02B 30/66

USPC ............................................. 62/3.1
See application file for complete search history.

(56) References Cited

U.S. PATENT DOCUMENTS

| 8,418,476 | B2 | 4/2013 | Heitzler et al. | |
| 8,596,077 | B2 | 12/2013 | Muller et al. | |
| 2010/0236258 | A1* | 9/2010 | Heitzler | F25B 21/00 62/3.1 |
| 2011/0192836 | A1 | 8/2011 | Muller et al. | |

(Continued)

FOREIGN PATENT DOCUMENTS

| FR | 2 904 098 A1 | 1/2008 |
| FR | 2 924 489 A1 | 6/2009 |
| FR | 2 937 182 A1 | 4/2010 |

OTHER PUBLICATIONS

International Search Report Corresponding to PCT/FR2012/000431 mailed Feb. 11, 2013.

*Primary Examiner* — Melvin Jones
(74) *Attorney, Agent, or Firm* — Davis & Bujold PLLC; Michael J. Bujold

(57) ABSTRACT

A magnetocaloric heat generator (1) which comprises at least one magnetocaloric unit (21) provided with at least one magnetocaloric material (3) in thermal contact with a heat transfer fluid (F) and at least one magnetic unit (41) capable of subjecting the magnetocaloric material (3) to a variable magnetic field. This generator (1) is characterized in that each unit (21, 41) has a modular configuration and comprises at least one fitting form (E1, E2, E3) which facilitates assembly with another unit (41, 21), along a same median axis (M), which is provided with a complementary fitting form (E1, E2, E3).

8 Claims, 3 Drawing Sheets

(56) References Cited

U.S. PATENT DOCUMENTS

2011/0289937 A1* 12/2011 Muller .................... F25B 21/00
                                                62/3.1
2011/0289938 A1* 12/2011 Heitzler ................. F25B 21/00
                                                62/3.1

* cited by examiner

MAGNETOCALORIC HEAT GENERATOR

This application is a National Stage completion of PCT/FR2012/000431 filed Oct. 24, 2012, which claims priority from French patent application serial no. 11/59839 filed Oct. 28, 2011.

FIELD OF THE INVENTION

This invention relates to a magnetocaloric heat generator comprising at least one magnetocaloric unit provided with at least one magnetocaloric material in thermal contact with a heat transfer fluid and at least one magnetic unit capable of subjecting said magnetocaloric material to a variable magnetic field.

BACKGROUND OF THE INVENTION

Magnetic refrigeration technology at ambient temperature has been known for more than twenty years and the advantages it provides in terms of ecology and sustainable development are widely acknowledged. Its limits in terms of its useful calorific output and its efficiency are also well known. Consequently, all the research undertaken in this field tends to improve the performances of a magnetocaloric heat generator, by adjusting the various parameters, such as the magnetization power, the performances of the magnetocaloric materials, the heat exchange surface between the heat transfer fluid and the magnetocaloric materials, the performances of the heat exchangers, etc.

Relating to the magnetization power, it is important to integrate in a magnetocaloric heat generator a device that will allow to generate the most intense magnetic field possible. Indeed, the magnetocaloric effect of a magnetocaloric material is closely linked to the intensity of the magnetic field it is subjected to. Therefore, the stronger this magnetic field, the stronger the magnetocaloric effect of said magnetocaloric material, and, consequently, the higher the efficiency of the magnetocaloric heat generator.

Another aspect that can be improved in the magnetocaloric heat generators, and in particular in the generators wherein at least one component is rotating around a central axis, relates to the thermal bridges that appear between the various components and lead to a degradation of the temperature gradient between the hottest side, called hot generator side, and the its coldest side, called a cold generator side. As a result, the performance of a magnetocaloric heat generator, which is closely linked to this temperature gradient, is reduced.

Another point that can be improved relates to the optimization of the design, manufacture and assembly of such heat generator.

Furthermore, in addition to the need for an usable energy efficiency, a magnetocaloric heat generator must also have a reduced size or volume, allowing for example to integrate it in a household appliance, a vehicle, etc.

Such examples are in particular described in publications US 2010/0236258, FR 2 924 489, FR 2 937 182 and FR 2 904 098 of the same applicant, wherein the various components of the generators are stacked on a common shaft driven in rotation.

SUMMARY OF THE INVENTION

The present invention aims to meet the above expectations and to offer a magnetocaloric heat generator with reduced manufacturing costs, increased thermal efficiency and a modularity that facilitates its assembly and allows a plurality of generator configurations according to the required thermal outputs, as well as a possible evolution.

To this purpose, the invention relates to a magnetocaloric heat generator of the kind described in the preamble, characterized in that each unit has a modular configuration and comprises at least one fitting form in order to be assembled, without common assembly shaft, along a same median axis, to another unit comprising a complementary fitting form. This assembly is performed without additional parts.

The generator according to the invention can furthermore comprise a hydraulic unit including at least a section of a circuit for the heat transfer fluid in thermal contact with said magnetocaloric material and a driving system for said heat transfer fluid, and said hydraulic unit can have a modular configuration and also comprise at least one fitting form in order to be assembled, along said median axis, to another unit comprising a complementary fitting form.

The generator can furthermore comprise at least one exchange unit capable of carrying out a heat exchange between the heat transfer fluid in thermal contact with said magnetocaloric material and another heat transfer fluid called external fluid, said exchange unit having a modular configuration and comprising at least one fitting form in order to be assembled, along said median axis, to another unit comprising a complementary fitting form.

To this purpose, said exchange unit can comprise at least two portions of fluidic circuits, a first circuit portion for the heat transfer fluid in thermal contact with said magnetocaloric material and a second fluidic circuit portion for said external fluid, said circuit portions being in thermal contact.

Said fitting forms can advantageously cooperate to perform an axial positioning along the median axis and a radial positioning in the radial plane perpendicular to the median axis of the units with respect to each other.

Furthermore, some of said fitting forms can cooperate to perform an axial positioning along the median axis, a radial positioning in the radial plane perpendicular to the median axis M and a rotational connection of the units with respect to each other.

In a particular embodiment, the generator can comprise two magnetic units mounted opposite to each other in order to form a magnetic gap wherein said magnetocaloric material of said magnetocaloric unit is located, said magnetic units can comprise each a part with a material continuity at the level of the median axis, said material being capable of conducing a magnetic field and said part carrying at least one magnetic assembly.

To this purpose, said magnetic assembly can comprise at least one permanent magnet and at least one pole piece.

Such arrangements allow advantageously to reduce the number of parts necessary for the assembly of the heat generator, each of said devices comprising the positioning means that allow it to be positioned with respect to one or to the adjacent device(s). As a result, the generator according to the invention has a modular configuration that facilitates its assembly and provides it with an increased adaptability.

BRIEF DESCRIPTION OF THE DRAWINGS

The present invention and its advantages will be better revealed in the following description of embodiments given as a non limiting example, in reference to the drawings in appendix, in which.

DETAILED DESCRIPTION OF THE PREFERRED EMBODIMENTS

In the illustrated embodiments, the identical pieces or parts have the same numerical references.

Figure 1:
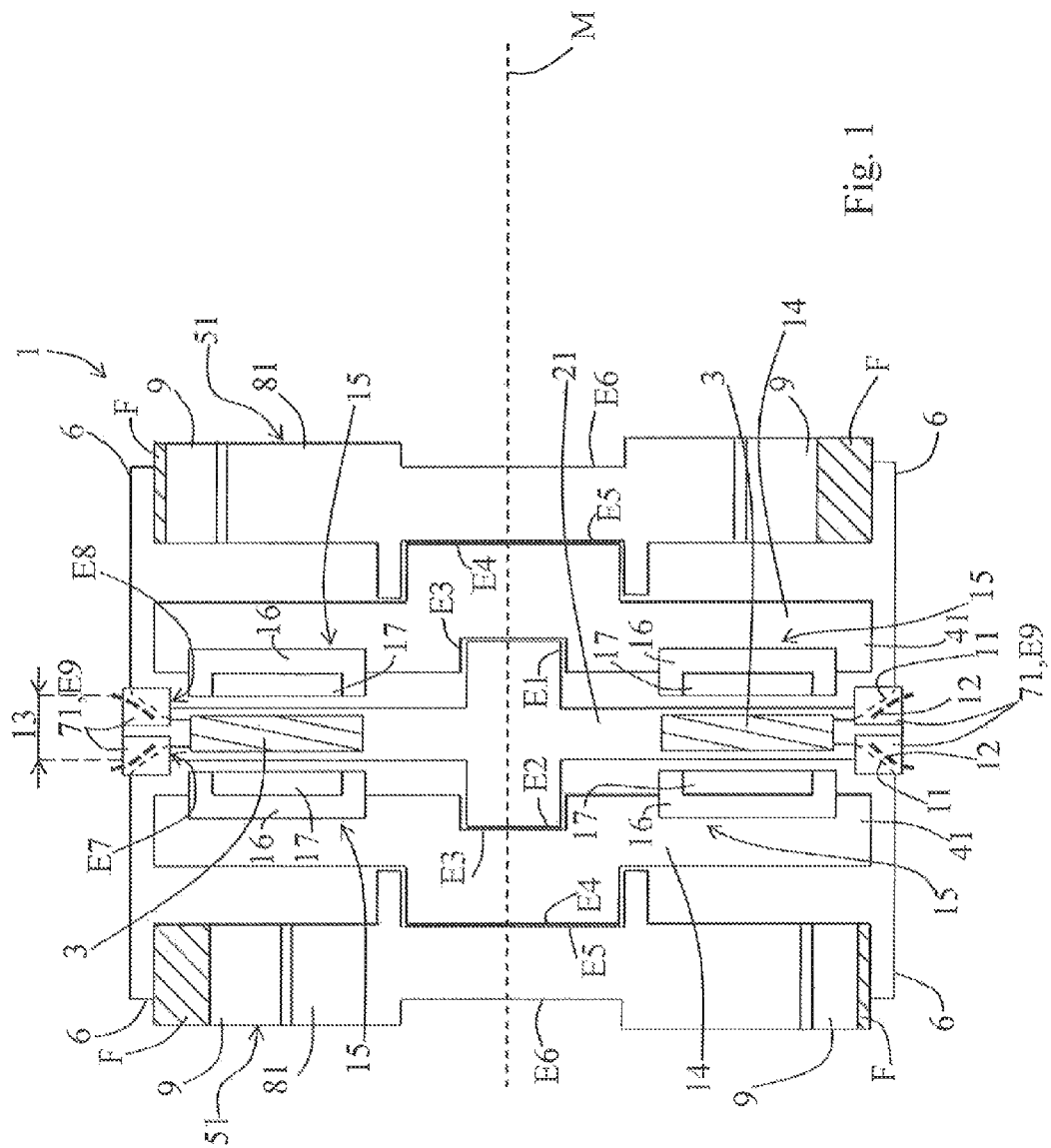
FIG. 1 is a schematic representation of a magnetocaloric heat generator with one thermal stage according to the invention.
Figure 2:
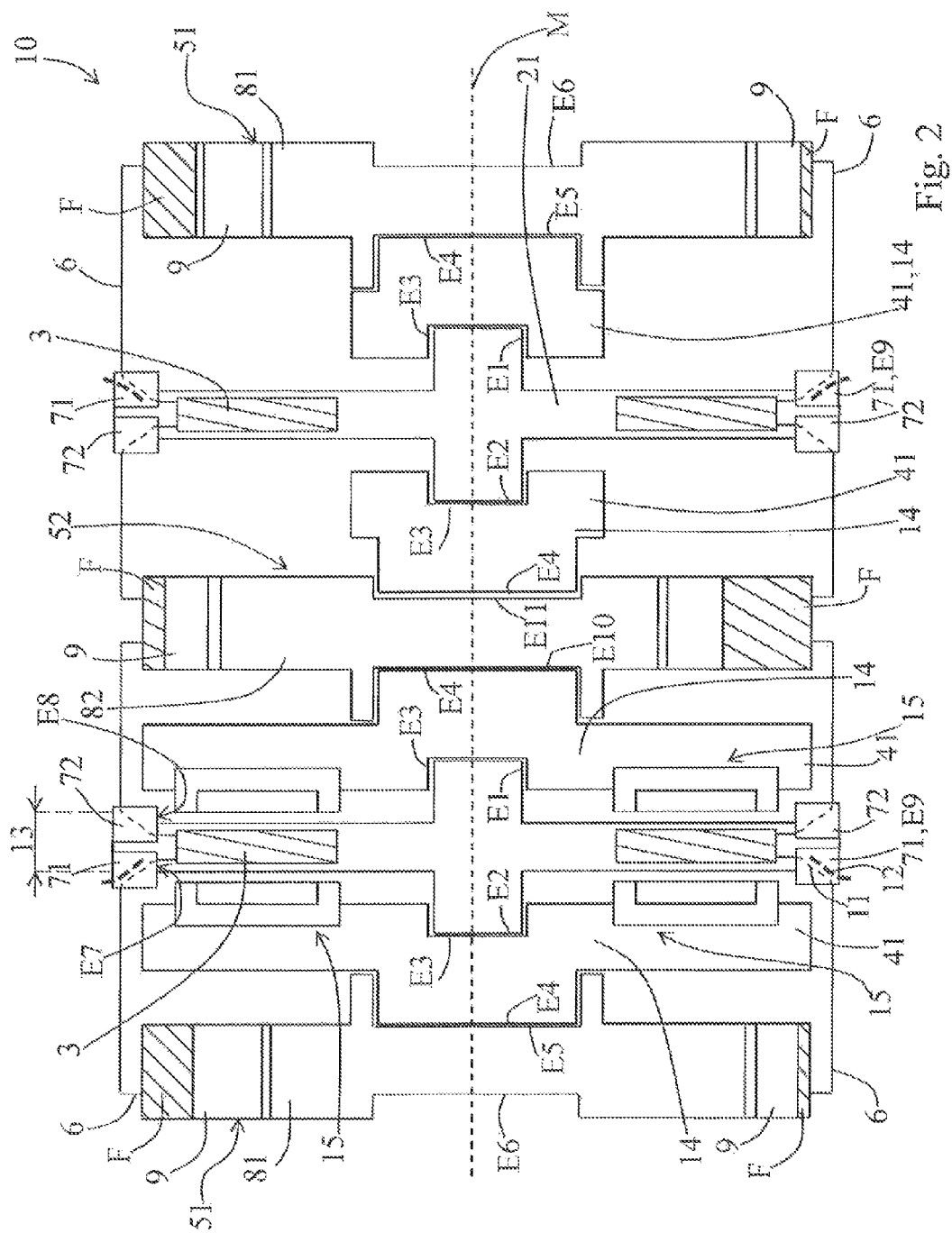
FIG. 2 is a schematic representation of a magnetocaloric heat generator with two thermal stages according to the invention.
Figure 3:
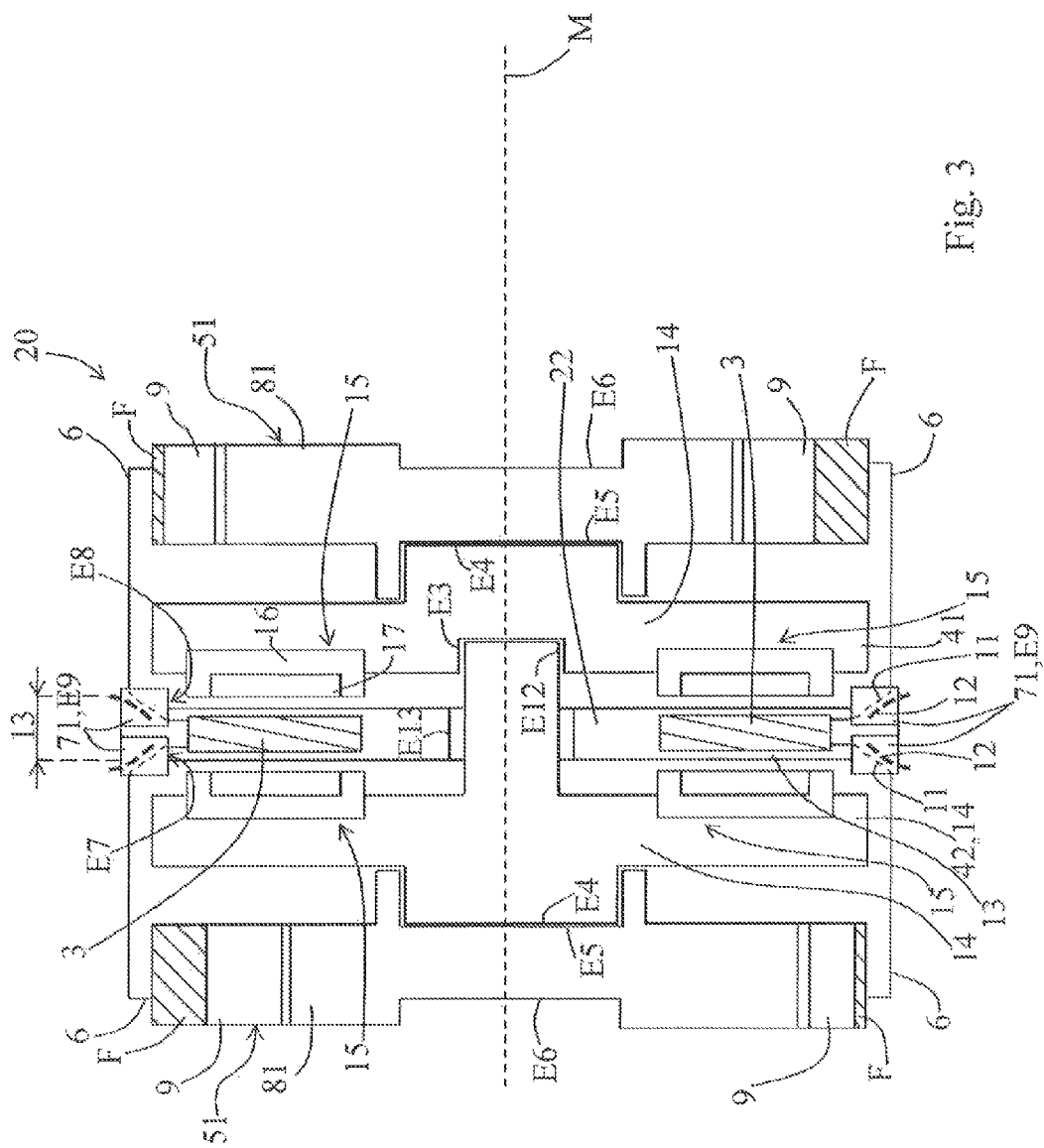
FIG. 3 is a schematic representation of a variant of the magnetocaloric heat generator of FIG. 1.

The FIGS. 1 to 3 of the attached drawings are embodiment examples of magnetocaloric heat generators 1, 10, 20 according to the invention. Such generators 1, 10, 20 exploit the magnetocaloric effect of so-called materials with giant magnetocaloric effect or magnetocaloric materials 3, which have the ability of cooling down and heating up instantly under the effect of the variations of a magnetic field.

In such generators 1, 10, 20, the magnetocaloric materials 3 are subjected to a variable magnetic field while being put in thermal contact with a heat transfer fluid F arranged to collect the frigories and calories produced by said materials. To this purpose, the magnetocaloric materials 3 are permeable to the heat transfer fluid F and made of one or several types of magnetocaloric materials 3 that include through fluid paths. These fluid paths can be made for example of the pores of a porous material, mini or micro-channels machined in a solid block or made of an assembly of superposed plates out of magnetocaloric material(s) spaced from each other or grooved. In the generators 1, 10, 20 illustrated in the attached FIGS. 1 to 3, the magnetocaloric materials 3 are made of an assembly of plates out of magnetocaloric material, stacked and spaced from each other in order to allow the passage of the heat transfer fluid F. Any other embodiment allowing the heat transfer fluid F to flow through said magnetocaloric materials 3 can of course be suitable.

In the magnetocaloric materials 3, the heat transfer fluid F flows alternately towards one or the other of the opposite ends of the magnetocaloric materials 3, according to the value of the magnetic field they are subjected to. The displacement of this heat transfer fluid F, linked with the variation of said magnetic field, allows setting up and then maintaining a temperature gradient between the two opposite ends called hot end and cold end of each magnetocaloric material 3. Opposite ends means the entry and exit areas of the heat transfer fluid F in, through or along said magnetocaloric materials 3.

The represented generators 1, 10 20 comprise several units 21, 22, 41, 42, 51, 52, 71, 72 ensuring specific functions of the generator 1, 10, 20 and manufactured as modules that can be fitted into each other by means of the fitting forms E1, E2, E3, E4, E5, E6, E7, E8, E9, E10, E11, E12, E13, which are integral parts of said various units 21 22, 41, 42, 51, 52, 71, 72.

These units 21 22, 41, 42, 51, 52, 71, 72 include more specifically:

magnetocaloric units 21, 22 containing the magnetocaloric materials 3, hydraulic units 51, 52 comprising driving means 81, 82 for the heat transfer fluid F in thermal contact with the magnetocaloric materials 3 and including at least a section of the hydraulic circuit 6 of the heat generator 1, 10, 20, magnetic units 41, 42 intended for subjecting said magnetocaloric materials 3 to cyclic magnetic field variations, exchange units 71 allowing to perform a thermal exchange between the heat transfer fluid F in thermal contact with the magnetocaloric materials 3 and another heat transfer fluid called external fluid connected to a device or application to be refrigerated, heated or tempered for example, and transfer units 72 ensuring the fluidic connection within the generator 1, 10, 20 and allowing more specifically to move the heat transfer fluid F between the magnetocaloric materials 3 and a hydraulic unit 52.

The generator illustrated in FIG. 1 comprises only one thermal stage, that is to say one single magnetocaloric unit 21 including magnetocaloric materials 3 arranged concentrically around the median axis M. These magnetocaloric materials 3 are magnetically stressed by two identical magnetic units 41 arranged symmetrically on both sides of the magnetocaloric unit 21. In this embodiment example, each magnetic unit 41 comprises, centered on its median axis M, a fitting form E3 that cooperates with a complementary fitting form E1, E2 of the magnetocaloric unit 21. In the generator 1 of FIG. 1, the fitting forms E1, E2 of the magnetocaloric unit 21 are protruding sections also called male sections, which can fit into recesses also called female sections with corresponding shapes composed of the fitting forms E3 of the magnetic units 41. This fitting assembly can be completed by a plain bearing or by bearings, or by any equivalent means allowing a relative movement between the magnetocaloric unit 21 and the magnetic units 41, that is to say, in this embodiment example, a rotary movement of the magnetic units 41 around the median axis M with respect to the magnetocaloric unit 21.

To this purpose, the magnetic units 41 comprise each a part 14 showing a material continuity. Material continuity means that this part 14 has no through opening for mounting it on a shaft or on a hub. Two magnetic assemblies 15 made each of permanent magnets 16 and at least one pole piece 17 capable of concentrating the magnetic flux produced by the permanent magnets 16 are mounted on this part 14, which is made out if iron in this example. The two magnetic units 41 are mounted so that their magnetic assemblies 15 are positioned opposite to each other in order to delimit a magnetic gap 13 wherein the magnetocaloric materials 3 of the magnetocaloric unit 21 are positioned. In the illustrated generator 1, the magnetic assemblies 15 of a same magnetic unit 41 are mounted symmetrically with respect to the median axis M and offset by an angle of 180°. This way, the rotation of said magnetic units 41 with respect to the magnetocaloric materials 3 generates magnetic field variations in said magnetocaloric materials 3, the magnetocaloric materials 3 located in an gap 13 being subjected to a magnetic field and the magnetocaloric materials 3 located outside an gap 13 being subjected to no magnetic field. It is of course possible to choose another equivalent configuration. The configuration in which each magnetic unit 41 comprises two magnetic assemblies 15 offset by an angle of 180° is given as an illustrative example, being well understood that it is possible, within the framework of this invention, to provide one or several magnetic assemblies 15 offset by another angular value, for example four magnetic assemblies offset by an angle of 90°.

Not mounting or stacking the various units 21, 41, 51, 71 around a common centering shaft, as is the case in the generators manufactured according to the teaching of the prior art, allows in particular manufacturing the magnetic units 41 out of one single solid part 14 showing a material continuity that therefore furthers the continuity of the magnetic flux in the magnetic device and allows obtaining, in comparison with an identical part 14 comprising an opening for mounting it on an axis, a higher magnetic field in the magnetic gap 13. The part 14 is mainly made out of a ferromagnetic material.

The magnetocaloric materials 3 are in contact with a heat transfer fluid F that circulates in a fluid circuit 6 integrated in the generator 1. This fluid is circulated by actuating means 81 integrated in a hydraulic unit 51. Such actuating means can be for example a cam 81 whose profile determines the stroke of pistons 9 or equivalent means connected to the circuit 6 of the heat transfer fluid F. This invention however does not exclude any other way of circulating the heat transfer fluid F. In this embodiment example, the generator 1 comprises two identical hydraulic units 51, one arranged on the hot side of the generator 1, the other on the cold side. The cam 81 of every hydraulic unit 51 is mounted onto a magnetic unit 41 by means of fitting forms E4, E5 achieving a radial positioning and an axial drive about the median axis M. This way, every hydraulic unit 51 is connected fixedly in rotation to a magnetic unit 41. In other words, the hydraulic units 51 and the magnetic units 41 form the rotor of the generator 1. This rotor can be driven in rotation by means of a drive motor or any equivalent drive system coupled to at least one of the hydraulic units 51 at a fitting form E6 by means of a transmission such as a timing pulley associated with a timing belt, a chain associated with a pinion, a gear or any other suitable transmission.

The fitting forms E4, E5 that allow the axial drive of the units 41, 51 cooperate to achieve an interference fit and a simple mechanical link. In the generator 1 of FIG. 1, the fitting forms E4, E5 of the magnetic units 41 and of the hydraulic units 51 can have a parallelepiped shape. Of course, the invention is not restricted to this configuration type and these fitting forms can have any other shape ensuring a rotary connection.

The purpose of the heat generator 1 according to the invention is to return or exchange the thermal energy it has produced with one or several external circuits or applications for heating, air-conditioning, tempering, etc. These external applications can be an air volume surrounding the heat generator, a thermal device or enclosure, for example. To this purpose, the generator 1 comprises two exchange units 71 mounted at each end of the magnetocaloric unit 21. Each exchange unit 71 comprises two fluidic circuit portions 11, 12, one circuit portion 11 being intended for receiving the heat transfer fluid F in thermal contact with said magnetocaloric materials 3 and the other circuit portion 12 being intended for receiving another heat transfer fluid called external fluid, thermally connected to the external circuit or application. The two circuit portions 11 and 12 are in thermal contact inside of the exchange unit 71 in order to take over the thermal energy produced by the magnetocaloric effect of the magnetocaloric materials 3. In the example of FIG. 1, the exchange units 71 are made of a ring housed in recesses E7, E8 with a corresponding shape of the magnetocaloric unit 21. The ring-shaped exchange units 71 form the complementary fitting forms E9 according to the invention.

So, the generator is made of modular units 21, 41, 51, 71 that can easily be assembled and allow, as represented in particular in FIG. 2, to manufacture, with the same units, other heat generators with different outputs. Such a modularity has the advantage of providing an easier assembly, of reducing the number of components of a generator according to the invention and therefore to facilitate the referencing of said parts, to increase their reliability, to reduce the storage volume and therefore to reduce the cost price of a heat generator 1 according to the invention.

Furthermore, this modularity allows simplifying the maintenance and all technical interventions, as it allows an easy uncoupling of two units 21, 41, 51, 71, whatever their position in the heat generator. In comparison, in a generator according to the prior art, it is necessary to dismount from the common shaft all functional elements located before the element requiring maintenance.

Moreover, the various units are assembled together in a self-supported way, by means of complementary fitting forms E1, E2, E3, E4, E5, E6, E7, E8, E9 fitted together by means of a cooperation of forms, without requiring a common shaft or hub. A part of this fitting assembly can be fastened to a frame, for example a support, or to any other equivalent fastening means, to achieve a fixed connection of the fixed units of said generator.

The generator 1 according to the invention does not comprise a central shaft whereon the various functional elements are mounted: the supporting shaft transmitting the rotary movement is replaced with a structural section of every modular unit 21, 41, 51, 71. This simplifies the structure and the assembly of the generator 1 according to the invention and allows reducing its weight. Moreover, using a central shaft in a generator of the prior art requires the mounting of spacers between the various functional elements, which leads to an increase of the number of parts making up the generator according to the prior art, higher storage needs, an assembly requiring more operations and resulting in a higher cost price.

In addition, another disadvantage due to the integration of a common shaft in the heat generators according to the prior art is due to the fact that a shaft has a given length and can therefore be intended only for a specific generator. In other words, a shaft intended for a generator with one thermal stage will be too short and cannot be integrated in a generator including two thermal stages or cannot allow a further evolution of said generator. Once more, such a disadvantage has an impact on the storage and on the referencing, and therefore on the global costs. On the contrary, the generator according to the invention is entirely modular, as the various units 21, 41, 51, 71 fit together according to the needs. This allows reducing the number of parts to manufacture, manage, store, transport and assemble, and therefore reducing the global cost price of said generator.

Another advantage due to the absence of a common shaft, and more specifically in a magnetocaloric heat generator comprising several stages of magnetocaloric materials, is the suppression of the thermal bridges due to the presence of this shaft and therefore the increase of the efficiency of the magnetocaloric heat generator. In the known generators according to the prior art, the shaft is in thermal and physical contact with the components of the generator and creates a thermal bridge between them. For example, for a generator including two thermal stages, the first stage including the cold side of the generator and the second stage including the hot side of the generator, the common shaft both stages are mounted on performs a thermal energy transfer or exchange between the two stages, affects the temperature gradient between the hot and the cold end, and therefore reduces the thermal output of the generator. The absence of such a common shaft in the generator 1 according to the invention allows eliminating this thermal bridge and increasing the efficiency of the generator. For this purpose, it is advantageous to manufacture all or some of the units 21, 22, 41, 42, 51, 52, 71, 72 out of one or more thermally non conductive materials.

FIG. 2 represents for this purpose a generator 10 with two thermal stages according to the invention. The generator 10 according to the invention is mainly made of the same units as the ones used for the assembly of the one-stage generator1 represented in FIG. 1. The only new or possibly different units are a new central hydraulic unit 52 provided with a cam 82 and mounted between the two thermal units 21 and two new fluid transfer units 72 replacing each an exchange unit 71 and ensuring each the circulation of the heat transfer fluid F between the two magnetocaloric units 21 and the central hydraulic unit 52. In comparison, a generator with two thermal stages according to the prior art would integrate in addition a new common shaft whose length would be adapted to its configuration and new spacers mounted between the additional components. Furthermore, an intervention inside of such a generator according to the prior art would require the complete dismantling of said generator.

Regarding the central hydraulic unit 52, it distinguishes itself from the hydraulic units 51 arranged at the ends of the generator 10 mainly by the hydraulic distribution it includes, since it is connected with two magnetocaloric units 21. The fitting forms E10 and E11 are respectively identical to the fitting forms E5 and E6 in order to ensure the modularity of the generator 2 according to the invention.

This heat generator 10 shows the same advantages as those described regarding the generator 1 represented in FIG. 1.

So, the invention offers a heat generator 1, 10 with a modular design, allowing an easily assembly, with a limited number of components and allowing a plurality of possible generator configurations in function of the required thermal outputs.

FIG. 3 represents an embodiment variant of the generator 1 according to the invention having the same advantages as those described for the generator 1 of FIG. 1. In the generator 20 of FIG. 3, the magnetic units 41, 42 are mounted facing each other in order to form a magnetic gap 13 and comprise complementary fitting forms E3, E12 that cooperate with each other. One 42 of the magnetic units comprises for this purpose a protruding section E12 intended for fitting in a corresponding fitting form E3 such as a recess of the other magnetic unit 41 to achieve an interference fit. This other magnetic unit 41 corresponds advantageously to the same part as that used for the generators 1 and 10 represented in FIGS. 1 and 2. The protruding section E12 has preferably a shape capable of connecting the two magnetic units 41, 42 in rotation. A quadrangular or oval shape is an example of such a possible form. It can nevertheless also be envisaged to manufacture this protruding section E12 with a circular shape and to integrate angular positioning means such as for example a pin, a threaded rod, a key, a serration, between the two magnetic units 41, 42.

In this embodiment variant, the magnetocaloric unit 22 is made of a ring that delimits a bore, centered on the median axis M and forming a fitting form E13, mounted on the protruding section E12 of the corresponding magnetic unit 41 by means of a pivoting link. This pivoting link can be achieved for example with bearings. Of course, any other equivalent means allowing a rotational guiding of a device with respect to the other, such as a plain bearing, can be used.

The manufacture of the functional generator units E1, E2, E3, E4, E5, E6, E7, E8, E9, E10, E11, E12, E13 as modules that can be assembled together by means of fitting forms 21, 22, 41, 42, 51, 52, 71, 72 that are integral parts of said units, without using a common shaft or hub passing through said units, allows offering a magnetocaloric heat generator 1, 10, 20 with an optimized design, reduced manufacturing costs, increased thermal efficiency, and which can have different configurations according to the required output. So, these units can be mounted together by means of the fitting forms they comprise, without requiring to mount and fasten them onto any through means such as a shaft or a hub.

POSSIBILITIES FOR INDUSTRIAL APPLICATION

This description shows clearly that the invention allows reaching the goals defined, that is to say offer a magnetocaloric heat generator showing an optimization of its efficiency, as well as reduced manufacturing work and costs, thanks to a modular configuration of its components.

The present invention is not restricted to the examples of embodiment described, but extends to any modification and variant which is obvious to a person skilled in the art while remaining within the scope of the protection defined in the attached claims.

The invention claimed is:

1. A magnetocaloric heat generator (1, 10, 20) comprising:
   at least one magnetocaloric unit (21, 22) provided with at least one magnetocaloric material (3) in thermal contact with a heat transfer fluid (F) and at least one magnetic unit (41, 42) capable of subjecting the magnetocaloric material (3) to a variable magnetic field,
   wherein each unit (21, 22, 41, 42) has a modular configuration and comprises at least one fitting form (E1, E2, E3, E12, E13) in order to be assembled, without common assembly shaft, along a same median axis (M), with another unit (41, 42, 21, 22) which comprises a complementary fitting form (E1, E2, E3, E12, E13).

2. The generator according to claim 1, wherein the generator further comprises a hydraulic unit (51, 52) which includes at least a section of a circuit (6) for the heat transfer fluid (F) in thermal contact with the magnetocaloric material (3) and a driving system (81, 82) for driving the heat transfer fluid (F), and the hydraulic unit (51, 52) has a modular configuration and also comprise at least one fitting form (E5, E6, E10, E11) which facilitates assembly, along the median axis (M), with another unit (21, 22, 41, 42) provided with a complementary fitting form (E4).

3. The generator according to claim 1, wherein the generator further comprises at least one exchange unit (71) capable of carrying out heat exchange between the heat transfer fluid (F), in thermal contact with the magnetocaloric material (3), and an external fluid, and the exchange unit (71) has a modular configuration and comprises at least one fitting form (E9) which facilitates assembly, along the median axis (M), with another unit (21, 22) provided with a complementary fitting form (E7, E8).

4. The generator according to claim 3, wherein the exchange unit (71) comprises at least two portions of fluidic circuits (11, 12), a first circuit portion (11) for the heat transfer fluid (F) in thermal contact with the magnetocaloric material (3) and a second circuit portion (12) for the external fluid, and the first and the second circuit portions (11, 12) are in thermal contact with one another.

5. The generator according to claim 1, wherein the fitting forms (E1, E3; E2, E3; E4, E5; E4, E10; E4, E11; E7, E9; E8, E9; E12, E3) cooperate to perform an axial positioning, along the median axis (M), and a radial positioning in a radial plane, perpendicular to the median axis (M), of the units (21, 22, 41, 42, 51, 52, 71) with respect to one another.

6. The generator according to claim 1, wherein the fitting forms (E5, E4; E10, E4; E11, E4; E12, E3) cooperate to perform an axial positioning along the median axis (M), a radial positioning in a radial plane perpendicular to the median axis (M), and a rotational connection of the units (41, 51; 41, 52; 42, 51) with respect to one another.

7. The generator according to claim 1, wherein the generator comprises two magnetic units (41, 42) mounted opposite to one another in order to form a magnetic gap (13),
- the magnetocaloric material (3) of the magnetocaloric unit (21, 22) is located in the magnetic gap (13),
- the magnetic units (41, 42) each comprise a part (14) with a material continuity at a level of the median axis (M),
- the material is capable of conducing a magnetic field, and
- the part (14) carries at least one magnetic assembly (15).

8. The generator according claim 7, wherein the magnetic assembly (15) comprises at least one permanent magnet (16) and at least one pole piece (17).

\* \* \* \* \*